Feb. 12, 1952    R. W. GUERNSEY    2,585,382
TORSIONAL VIBRATION DAMPER
Filed June 25, 1948    2 SHEETS—SHEET 1

Inventor
Robert W. Guernsey
By Spencer, Willits, Helwig & Baillio
Attorneys

Feb. 12, 1952   R. W. GUERNSEY   2,585,382
TORSIONAL VIBRATION DAMPER

Filed June 25, 1948   2 SHEETS—SHEET 2

Inventor
Robert W. Guernsey
By
Spencer, Willits, Helmuth & Baillio
Attorneys

Patented Feb. 12, 1952

2,585,382

UNITED STATES PATENT OFFICE 2,585,382

TORSIONAL VIBRATION DAMPER

Robert W. Guernsey, Detroit, Mich., assignor to General Motors Corporation, Detroit, Mich., a corporation of Delaware Application June 25, 1948, Serial No. 35,272

12 Claims. (Cl. 74—574)

This invention has to do with devices for reducing torsional vibration of rotating shafts, such as the crankshafts of engines. The damper herein disclosed has been successfully applied to the crankshaft of two cycle, six cylinder diesel engines but it will be appreciated that it is capable of application to any rotatable shafting subject to torsional vibration.

A common type of torsional vibration damper heretofore extensively used consists of a mass, which may be in the shape of a fly-wheel or an annulus, resiliently connected to the shaft by means of springs or preferably by means of rubber bonded to the shaft and to the mass. Such dampers are so designed that the mass is set in oscillation by torsional vibration of the shaft and this oscillation is out of phase with the torsional oscillation of the shaft so as to oppose its vibratory movement. Where the mass is connected to the shaft by means of rubber as described a certain amount of damping action is affected by absorption of energy in internal friction in the rubber as a consequence of the distortion of the rubber produced by oscillation of the mass. A damper such as described is commonly known as a harmonic balancer. A characteristic of such balancers is the fact that when designed to suppress torsional vibration at a certain speed of rotation of the shaft it will do so to a very considerable degree but there will frequently result new vibrations or increased vibrations at speeds above and below the speeds at which the original torsional vibration took place. These resultant torsional vibrations may in themselves be objectionable.

I have found it to be possible to greatly improve the performance of dampers of the type described by embodying in them additional means for absorbing in friction the energy of the torsional vibration of the shaft. This may be accomplished by incorporating in the damping mass or attaching to the mass a second damping mass by what may be described as a frictional connection. In the preferred form of the invention the second damping mass may be annular in form and may be mounted in a closely fitting sealed annular chamber from which it is separated by a thin film of viscous fluid, preferably one of the silicone compounds. With this arrangement, as the shaft accelerates under torsional vibration the force is transmitted through the rubber or other resilient connection to the housing for the annular mass and thence through the viscous film to the annular mass causing it to rotate with the shaft. Should the shaft engage in torsional oscillation, the annular mass, owing to its inertia, will tend to continue to move at uniform velocity with the result that the viscous film is repeatedly sheared as long as the oscillation of the shaft continues thus damping the vibration. With the arrangement described the energy represented by torsional vibration is absorbed both by internal friction in the rubber connection and by shearing of the viscous film on which the annular mass is supported. At the same time the oscillatory movement of the damper assembly supported by the resilient coupling is out of phase with the torsional vibration of the shaft so that it opposes the vibratory movement of the shaft and so tends to damp it out.

I find the described damper to be very satisfactory in actual operation and very effective in suppressing torsional vibration throughout the operating range of the engine.

Various modifications of the invention will be pointed out in the course of the following description and will be found to be within the scope of the accompanying claims.

Figure 1:
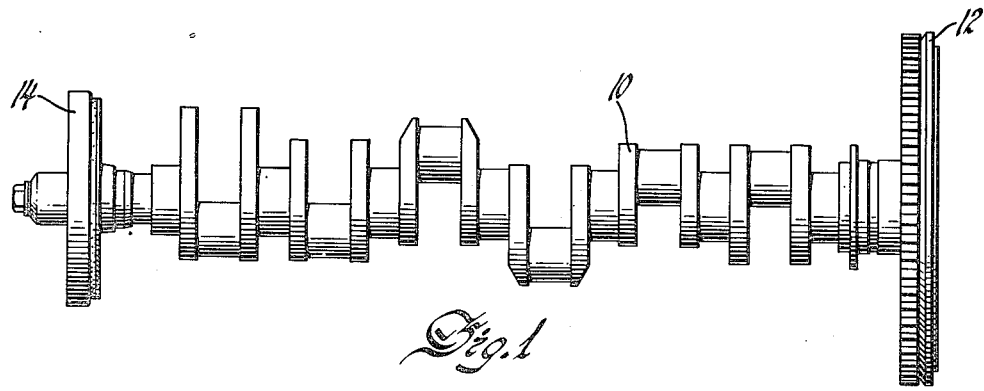
Figure 1 is a top plan view of an engine crankshaft to which my improved damper is applied.

In Figure 1, 10 indicates a conventional engine crankshaft provided at one end with a fly-wheel 12 and at the other end at 14 with one embodiment of my improved torsional vibration damper. The specific crankshaft illustrated is a six throw counterweighted crankshaft extensively used in two cycle diesel engines. However, it will be understood that the invention is equally applicable to any rotary shafts in which torsional vibration is a problem.

Figures 2, 3:
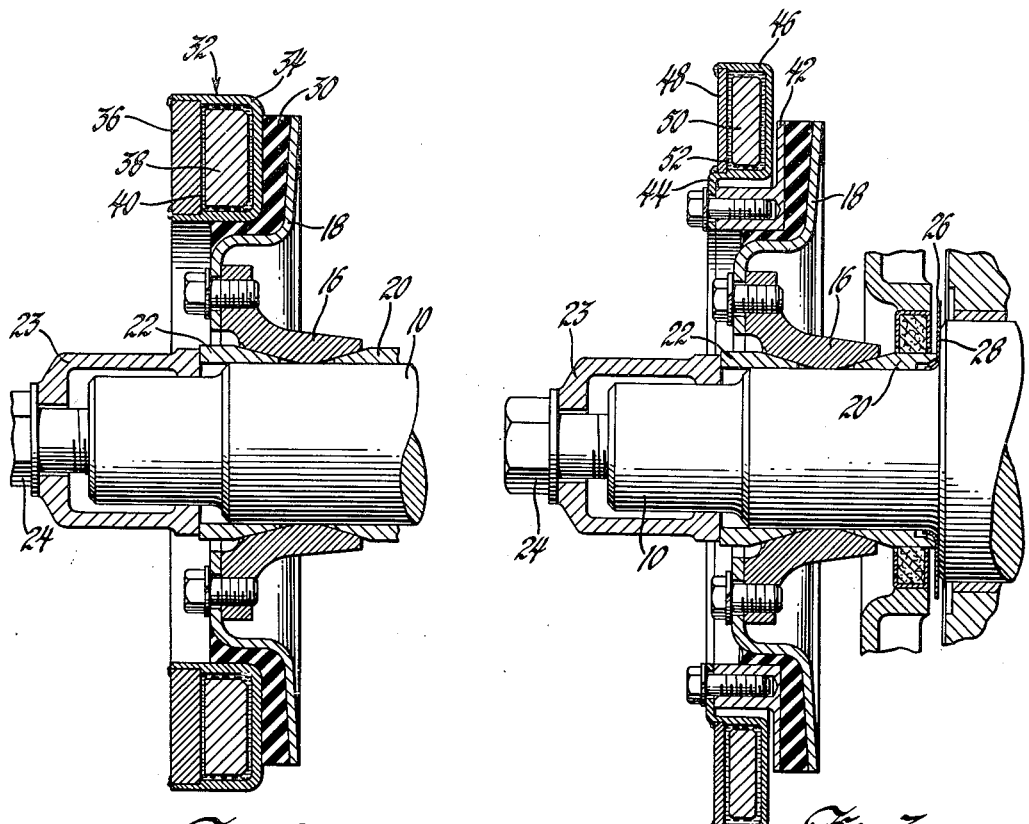
Figure 2 is a vertical, sectional view through one form of such damper.
Figure 3 is a similar section through a modified form of damper.

Referring to the form of damper shown in Figure 2, 10 indicates an end of the crankshaft to which is secured, by any suitable means, collar 16 having bolted or otherwise secured to it annular stamping 18 to which the damper assembly is secured.

The securing means for collar 16, as shown in detail in Figure 3, consists of friction cones 20 and 22 which are forced into tight gripping engagement with the shaft and with mating conical surfaces provided in the ends of collar 16 by cone retainer 23 engaging the cone 22 as shown and forced into engagement with said cone by bolt 24 threaded into the end of the crankshaft. Inner cone 20 is held against movement axially of the shaft by engagement with stamping 26 which in turn bears against shoulder 28 upon the shaft.

Referring now to Figure 2, there is secured to stamping 18 by means of annulus 30, preferably of rubber, a damping mass 32 consisting of an annular housing 34 substantially U-shaped in cross-section as shown and having welded or otherwise secured over its open end annular cover 36. Cover 36 may itself be of substantial cross-section to increase its mass and, therefore, its damping effect. Parts 34 and 36 provide an annular housing within which is located the second damping mass 38. Mass 38 is supported on and separated from the annular housing by viscous fluid 40. This fluid should be such that its viscosity does not vary over the temperature range encountered in the operation of the device and for this purpose it has been found preferable to use a silicone composition. It will be understood, of course, that the rubber annulus 30 is bonded both to the stamping 18 and to the annular housing 34 by well-known methods of uniting rubber and metal.

With the described construction torsional vibration of the shaft 10 and of collar 16 and stamping 18 secured to it will be transmitted through the rubber annulus 30 to the damping mass constituted by the annular housing 34—36. The parts so far described will in themselves do substantial damping, if the parts are properly designed, for the resultant oscillatory movement will be out of phase with the torsional oscillations of the shaft and hence oppose the vibratory movement and at the same time a considerable amount of the energy of vibration will be damped by internal friction in the rubber 30 consequent upon the distortion to which it is subjected by the oscillation of the mass 34—36.

The damping action is greatly increased by the presence in the housing 34—36 of the second damping mass 38 which tends to rotate at constant velocity so that when the first mass consisting of the annular receptacle 34—36 begins to oscillate back and forth in response to torsional vibration the viscous fluid film 40 is repeatedly sheared, thereby dissipating some of the energy of vibration in heat resulting from fluid friction.

Figure 7:
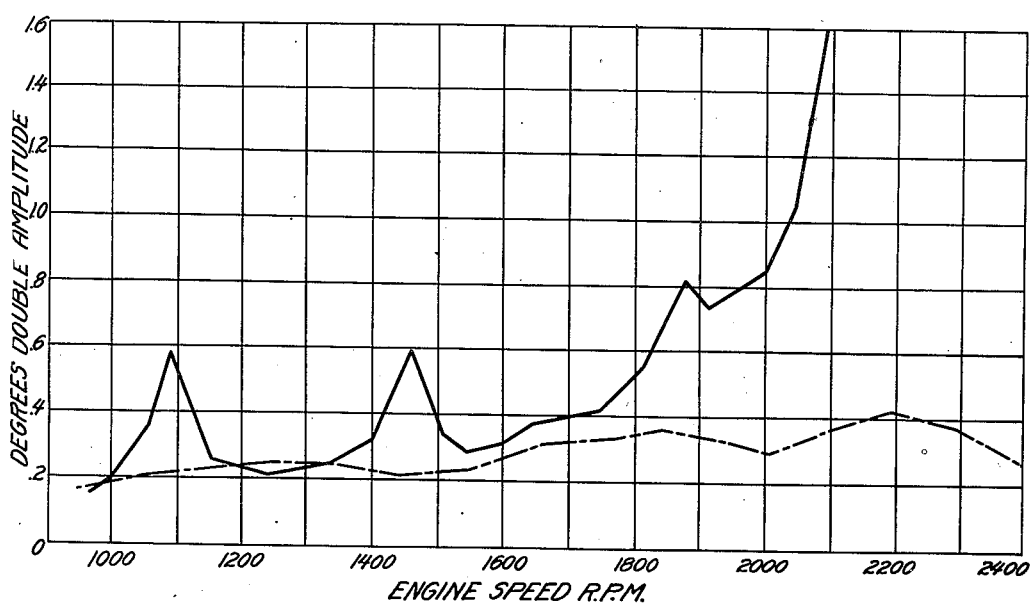
Figure 7 is a graph illustrating the damping obtained by one application of my improved damper.

I have shown in Figure 7 performance curves obtained with the use of the damper just described on a six cylinder, two cycle diesel engine. The ordinates represent the total amplitude of torsional vibration produced, while the abscissae indicate engine speed in revolutions per minute. The full line curve indicates the torsional vibration with no torsional vibration dampers on the shaft. It will be noted that excessive vibration occurs in the neighborhood of 2100 R. P. M., but that objectionable vibration also occurs in the neighborhood of 1100 R. P. M., 1460 R. P. M., and from approximately 1800 to 2100 R. P. M.

The dot and dash line indicates the torsional vibration characteristics obtained when the improved damper shown in Figure 2 is used. It will be noted that there is substantially no vibration of an amplitude greater than .4° and vibration of such relatively low amplitude is not seriously objectionable.

In Figure 3 there is shown a modification of the invention. Here the damper mass assembly consists of annulus 42 to which is bolted or otherwise secured flange 44 integral with annular housing 46 having a welded-on cover 48 and containing mass 50 surrounded as before with viscous fluid 52. Here the first mass consists of the annulus 42 together with the annular housing 46—48. The advantages of this design are as follows:

(a) Viscous friction and elastic members of damper may be handled as individual units in manufacture.

(b) Tuning of unit may be adjusted to different engine requirements by changing elastic unit without influencing friction unit.

(c) Mass 42 may be changed to suit requirements of particular installation.

(d) By supporting the damping masses in an overhung manner as shown they will also have a tendency to suppress to some extent beam vibrations of the crankshaft.

Figure 4:
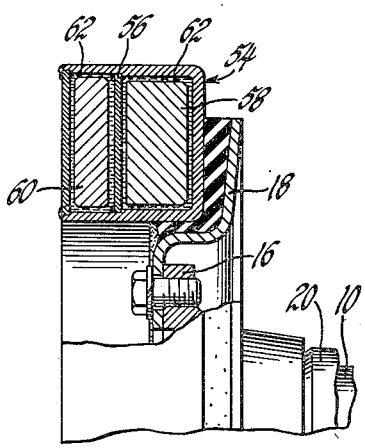
Figures 4, 5 and 6 are sections similar to the upper part of Figure 2 showing further modifications.

The modification shown in Figure 4 is similar to that shown in Figure 2 except that the housing 54 is enlarged and is provided with a partition 56, which may be welded in place as shown, thereby providing two annular chambers instead of one. One of these chambers contains a large annular mass 58 and the other a smaller annular mass 60, each being surrounded by viscous fluid 62 as in the preceding forms. The masses 58 and 60 respond differently to torsional vibration as a consequence of their difference in inertia, thereby broadening the range of effectiveness of the damper.

Figure 5:
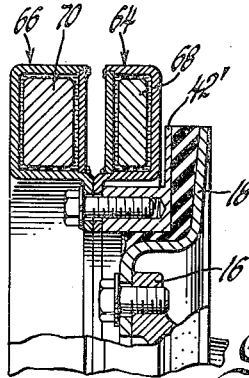

The modification shown in Figure 5 is similar to that shown in Figure 3 except that two viscous fluid supported damping masses are employed, the design in this respect being similar to that of Figure 4. Here annulus 42' has bolted to it as shown annular housings 64 and 66, complete with welded-on covers. Within housing 64 is small annular mass 68 and within housing 66 is larger annular mass 70. The operation of this form of the invention is substantially the same as that shown in Figure 4, but has the advantage that greater cooling area is provided as each of the two housings is complete and they are separated from each other.

Figure 6:
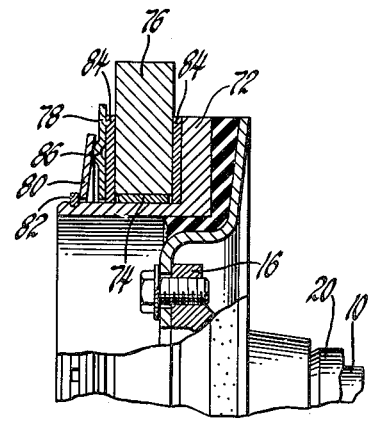

In Figure 6 there is shown a modification similar to that shown in Figure 2 except that there is what may be termed a dry friction coupling between the annular mass and its support. Here annulus 72, which is L-shaped in cross-section, is rubber-bonded to the shaft as in the other figures and has secured to it a suitable annular bearing or bushing 74, preferably of the oil saturated or so-called "oilless" type. The second annular mass 76 is mounted on bearing 74 so as to be capable of rotation. Mass 76 is secured in place by annular stamping 78, against which bears Belleville washer 80, held on annulus 72 by snap ring 82, which seats in an annular groove in annulus 72. Friction facing material 84 is secured to stamping 78 and to the radial portion of annulus 72 as shown. Stamping 78 may be provided with annular ridge 86 as shown to engage the Belleville washer 80.

It will be understood that with this construction the conical Belleville washer 80 is stressed on assembly so that it yieldingly urges stamping 78 with its friction facing material 84 against one side of mass 76, causing the latter to bear against friction facing 84 on annulus 72. Mass 76 is thus yieldingly and frictionally held against rotation.

The form of the invention shown in Figure 6 will operate substantially the same as those shown in Figures 2 and 3 except to the extent that the frictional characteristics of the two devices differ. Thus, in normal operation the entire assembly of annulus 72 and the parts covered by it will rotate as a unit with the shaft. Should the shaft go into torsional oscillation at a frequency to which the damper is responsive, the described assembly will tend to oscillate back and forth as a unit, but, owing to its inertia, the mass 76 will tend to continue to rotate at uniform speed, thereby breaking the friction connection at its contacts with the friction facings 84 and with the bearing 74. The result will be to dissipate some of the energy of vibration in heat produced by friction, the effect being similar to that produced in the other forms of the invention by repeated shearing of the viscous fluid film.

The invention is susceptible of considerable modification in practice. If the energy of torsional vibration which must be dissipated to produce satisfactory damping is large, it may be desirable to provide the housing in the forms shown in Figures 2, 3, 4 and 5 or the mass 76 in the form shown on Figure 6, with suitable cooling fins. In some instances it may be desirable to provide a crankshaft with several independent damper assemblies such as shown in Figures 2, 3 or 6, each designed to damp a particular frequency or frequencies of vibration. For some installations where several damping masses are employed as in Figures 4 and 5, it may prove desirable to dispense with the rubber bonding and connect the damper assembly or assemblies directly to the rotating shaft.

Various other modifications will occur to those skilled in the art.

I claim:

1. The combination of a shaft subject to torsional vibration, an annular support on the shaft, an annular receptacle surrounding the shaft, resilient means permanently connecting the annular receptacle to the annular support to rotate at the same average speeds, and an annular mass in said receptacle and coaxial therewith, said receptacle containing viscous fluid enveloping the annular mass and supporting it therein.

2. The combination of a shaft subject to torsional vibration, an annular receptacle concentric with the shaft, a rubber bonded mounting securing the receptacle to the shaft, and an annular mass coaxial with the crankshaft supported in said receptacle by viscous fluid.

3. The combination of an annular support adapted to be secured to a rotatable shaft, an annular housing, yieldable means permanently securing said support to said housing in concentric relation and permitting relative angular movement thereof about their axes while rotating said housing at the average speed of said support, an annular inertia member in said housing substantially concentric therewith and arranged for frictionally restrained rotational movement with respect thereto.

4. The combination of a support adapted to be secured to a rotatable shaft, an annular housing, a yieldable coupling of rubber or the like permanently securing said support to said housing in concentric relation and rotating said housing at the average speed of said support, an annular inertia member in said housing substantially concentric therewith, and a relatively thin fluid film in said housing enveloping said inertia member and supporting it in said housing for relative rotational movement.

5. The combination of a support adapted to be secured to a rotatable shaft, an annular housing, a yieldable rubber ring fixed with respect to and permanently securing said support to said housing in concentric relation to rotate at the same average speeds, said ring being substantially wedge-shaped in cross section with the base of the wedge farthest from the center of the ring, an annular inertia member in said housing substantially concentric therewith and arranged for frictionally restrained rotational movement with respect thereto.

6. The combination of a support adapted to be secured to a rotatable shaft, an annular housing, a yieldable rubber ring fixed with respect to and permanently securing said support to said housing in concentric relation, said ring being substantially wedge-shaped in cross section with the base of the wedge farthest from the center of the ring, an annular inertia member in said housing substantially concentric therewith and closely fitting but radially movable with respect to the walls thereof, and a relatively thin fluid film in said housing enveloping said inertia member and supporting it in said housing.

7. The combination of a support adapted to be secured to a rotatable shaft, a plurality of annular housings, yieldable means securing said support to said housing in concentric relation, an annular inertia member in each of said housings substantially concentric therewith and arranged for frictionally restrained radial and rotational movement with respect thereto, said inertia members differing substantially in mass so as to respond to different intensities of vibration.

8. The combination of a support adapted to be secured to a rotatable shaft, an annular housing having an annular partition therein dividing it into two annular chambers, a yieldable coupling of rubber or the like securing said support to said housing in concentric relation, an annular inertia member in each of said chambers substantially concentric therewith and arranged for frictionally restrained radial and rotational movement with respect thereto, said inertia members and the corresponding chambers differing substantially in size so that the said members will respond to different intensities of vibration.

9. A combination of a support adapted to be secured to a body subject to torsional vibration upon rotation thereof, said support being formed to provide an annular channel therein, said channel being formed to provide openings at one side and at the periphery thereof, a resilient annular member disposed in said channel, an annular housing projecting into said resilient annular member in spaced and concentric relation to the cylindrical and radial walls forming said channel in said support, said resilient annular member being bonded to the adjacent surfaces of said support and said housing, and an annular inertia member within said annular housing, said inertia member being disposed within said housing in spaced and radially movable relation to the walls thereof and being supported therein by a liquid having the property of frictionally opposing relative rotation between said housing and said inertia member.

10. An annular housing having a pair of concentric walls and having an end wall welded and hermetically sealed therein, said end wall comprising an inertia member having a thickness greater than the thickness of the remaining walls of said housing, an annular inertia member within said housing and being radially and axially spaced from the interior surfaces of said housing, a liquid film within the space between the adjacent surfaces of said inertia member and said housing, said film having the property of frictionally opposing the relative rotation of said inertia member and said housing, and means for securing said housing concentrically about the axis of rotation of a rotating body subject to torsional vibration.

11. A pair of oppositely disposed annular housings having hermetically sealed end walls forming the adjacent end surfaces thereof, said housings being of approximately the same internal diameters and having radially inwardly projecting flanges formed at adjacents ends of the inner circumferential walls of said housings, said housings being provided with annular inertia members of unequal masses disposed in spaced relation to the interior surfaces thereof, a fluid film within each of said housings and disposed in the spaces between the opposed surfaces of said housings and said inertia members, said fluid films having the property of frictionally opposing relative rotation of said inertia members and said housings, and means for securing said inwardly projecting flanges about the axis of rotation of a rotating body subject to torsional vibration.

12. A pair of oppositely disposed annular housings having hermetically sealed end walls forming the adjacent end surfaces thereof, said housings being of approximately the same internal diameters and having radially inwardly projecting flanges formed at adjacent ends of the inner circumferential walls of said housings, said housings being provided with annular inertia members of unequal masses disposed in spaced relation to the interior surfaces thereof, a fluid film within each of said housings and disposed in the spaces between the opposed surfaces of said housings and said inertia members, said fluid films having the property of frictionally opposing relative rotation of said inertia members and said housings, and annular resilient mounting means for securing said inwardly projecting flanges about the axis of rotation of a rotating body subject to torsional vibration.

ROBERT W. GUERNSEY.

REFERENCES CITED

The following references are of record in the file of this patent:

UNITED STATES PATENTS

| Number | Name | Date |
| --- | --- | --- |
| 1,969,755 | Kellogg | Aug. 14, 1934 |
| 2,041,507 | Zeder | May 19, 1936 |
| 2,049,133 | Peirce | July 28, 1936 |
| 2,380,770 | McFarland | July 31, 1945 |
| 2,383,516 | Salmon | Aug. 28, 1945 |
| 2,454,980 | Sobell | Nov. 30, 1948 |
| 2,477,081 | Peirce | July 20, 1949 |
| 2,514,136 | O'Connor | July 4, 1950 |
| 2,514,139 | O'Connor | July 4, 1950 |

OTHER REFERENCES

The Elimination of Torsional Vibration, page 234, G. J. Dashefsky, Penna. State College Bulletin, School of Engineering Technical Bulletin No. 12, Nov. 1, 1930.

Torsional Vibration Damper, by Bernard E. O'Connor, Machine Design, April 1947, pages 155–159.